US011157659B2

(12) United States Patent
Courousse et al.

(10) Patent No.: US 11,157,659 B2
(45) Date of Patent: Oct. 26, 2021

(54) METHOD FOR EXECUTING A POLYMORPHIC MACHINE CODE OF A PREDETERMINED FUNCTION BY A MICROPROCESSOR

(71) Applicant: COMMISSARIAT A L'ENERGIE ATOMIQUE ET AUX ENERGIES ALTERNATIVES, Paris (FR)

(72) Inventors: Damien Courousse, Grenoble (FR); Thomas Hiscock, Grenoble (FR); Olivier Savry, Sassenage (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 174 days.

(21) Appl. No.: 16/470,067

(22) PCT Filed: Dec. 14, 2017

(86) PCT No.: PCT/FR2017/053592
§ 371 (c)(1),
(2) Date: Jun. 14, 2019

(87) PCT Pub. No.: WO2018/115650
PCT Pub. Date: Jun. 28, 2018

(65) Prior Publication Data
US 2020/0089919 A1 Mar. 19, 2020

(30) Foreign Application Priority Data
Dec. 19, 2016 (FR) .................................... 1662780

(51) Int. Cl.
*G06F 21/75* (2013.01)
*H04L 9/06* (2006.01)
(Continued)

(52) U.S. Cl.
CPC ............ *G06F 21/75* (2013.01); *H04L 9/0662* (2013.01)

(58) Field of Classification Search
CPC ...... G06F 21/75; G06F 21/755; G06F 21/556; H04L 9/0662; G09C 1/00
See application file for complete search history.

(56) References Cited

U.S. PATENT DOCUMENTS 9,489,315 B2 11/2016 Courousse
10,742,400 B2 * 8/2020 Chen ........................ H04L 9/06
(Continued)

FOREIGN PATENT DOCUMENTS

FR 3 011 354 A1 4/2015
FR 3011354 A1 * 4/2015 ........... G06F 21/755
(Continued)

OTHER PUBLICATIONS

"Can Code Polymorphism Limit Information Leakage?" Amarilli et al Springer Berlin, Heidelberg, XP55138447 https://link.springer.com/content/pdf/10.1007%2F978-3-642-21040-2.pdf Jun. 1, 2011 (Year: 2011).*

(Continued)

*Primary Examiner* — Randy A Scott
(74) *Attorney, Agent, or Firm* — Oblon, McClelland, Maier & Neustadt, L.L.P.

(57) ABSTRACT

A method for executing a polymorphic machine code, wherein: for each branching address at which a base block of a flow of generated instructions starts, the microprocessor automatically adds, in the generated flow of instructions, a renewal instruction suitable, when it is executed, for triggering the renewal of an initialization vector of a module for decryption by flow with a specific value associated with this branching address, then a flow encryption module encrypts the flow of instructions as it is generated and, during this encryption, each base block is encrypted using a specific value associated with the branching address at which it starts. Only the instruction flow encrypted in this way is recorded in the main memory. During execution of the encrypted instruction flow, the added renewal instructions are executed as they are encountered.

14 Claims, 4 Drawing Sheets

(51) Int. Cl.
*H04L 29/06* (2006.01)
*H04L 9/14* (2006.01)

(56) References Cited

U.S. PATENT DOCUMENTS

| | | | |
|---|---|---|---|
| 2005/0271202 A1 | 12/2005 | Shu et al. | |
| 2005/0273630 A1 | 12/2005 | Shu et al. | |
| 2005/0273631 A1 | 12/2005 | Shu et al. | |
| 2007/0180541 A1 | 8/2007 | Shu et al. | |
| 2012/0144205 A1 | 6/2012 | Shu et al. | |
| 2014/0355754 A1* | 12/2014 | Leung | H04L 9/065 380/28 |
| 2015/0095659 A1* | 4/2015 | Courousse | G06F 21/602 713/190 |
| 2017/0214523 A1 | 7/2017 | Pebay-Peyroula et al. | |

FOREIGN PATENT DOCUMENTS

| | | | |
|---|---|---|---|
| FR | 3 047 100 B1 | 3/2018 | |
| WO | WO 2005/124506 A2 | 12/2005 | |
| WO | WO-2005124506 A2 * | 12/2005 | G06F 9/30181 |
| WO | WO 2018/115650 A1 | 6/2018 | |

OTHER PUBLICATIONS

"Stream Ciphers and Block Ciphers"—Ruben Niederhagen, Eindhoven University of Technology, Sep. 18, 2013 https://www.hyperelliptic.org/tanja/teaching/crypto14/20140918-lecture.pdf (Year: 2013).*

"Construction of Stream Ciphers from Block Ciphers and their Security"—Sridevi et al, IJCSMC, vol. 3, Issue 9, Sep. 2014 https://ijcsmc.com/docs/papers/September2014/V3I920 1499a18.pdf (Year: 2014).*

International Search Report dated Apr. 12, 2018 in PCT/FR2017/053592 filed on Dec. 14, 2017.

May, D. et al., "Random Register Renaming to Foil DPA," Springer-Verlag Berlin Heidelberg, 2001, pp. 28-38.

Henson, M. et al., "Memory Encryption: A Survey of Existing Techniques," ACM Computing Surveys, vol. 46, No. 4, Article 53, 2014, pp. 53:1-26.

Goldreich, O. et al., "Software Protection and Simulation on Oblivious RAMs," 1996, pp. 1-50, 51 total pages.

Clavier, C., "Side Channel Analysis for Reverse Engineering (SCARE) an Improved Attack Against a Secret A3/A8 GSM Algorithm," Gemplus S.A., Card Security Group, 2004, 13 total pages.

Zhuang, X. et al., "Hardware Assisted Control Flow Obfuscation for Embedded Processors," CASES'04, 2004, pp. 1-11.

De Canniere, C. et al., "Trivium Specifications," Katholieke Universiteit Leuven, 2006, 7 total pages.

Suh, G. E. et al., "AEGIS: A single-chip secure processor," Information Security Technical Report, vol. 10, 2005, pp. 63-73.

San Pedro, M. et al., "FIRE: Fault Injection for Reverse Engineering," IFIP International Federation for Information Processing, 2011, pp. 280-293.

May, D. et al., "Non-deterministic Processors," Springer-Verlag Berlin Heidelberg, 2001, pp. 115-129.

Bruguier, F. et al., "Cost-Effective Design Strategies for Securing Embedded Processors," IEEE Transactions on Emerging Topics in Computing, 2015, pp. 1-14, 15 total pages.

Agosta, G. et al., "A Code Morphing Methodology to Automate Power Analysis Countermeasures," DAC'12, 2012, pp. 77-82.

* cited by examiner

METHOD FOR EXECUTING A POLYMORPHIC MACHINE CODE OF A PREDETERMINED FUNCTION BY A MICROPROCESSOR

The invention relates to a method for executing a polymorphic machine code of a predetermined function by a microprocessor. The invention also relates to a polymorphic machine code, an information recording medium and an electronic apparatus for implementing this method.

The application US2015/0095659A1 describes a method for executing a polymorphic machine code of a predetermined function by a microprocessor wherein the microprocessor:

a) acquires a numerical value capable of varying, from one execution to another of the same polymorphic machine code, then b) generates, according to the numerical value acquired, a first and, alternately, a second instruction stream, these first and second instruction streams each being capable of performing the predetermined function when they are executed by the microprocessor, each of these instruction streams being formed of a succession of basic blocks, each basic block starting at a branch address and ending with a branch instruction to a branch address of another basic block, these first and second instruction streams being distinguished from each other by at least one instruction opcode or a different operand or a different literal value or a different number of instructions, c) records the generated instruction stream in a main memory, then d) executes the generated instruction stream that has just been recorded.

Such an execution method has the advantage of making attempts at side channel attack or cryptanalysis more difficult. Such attacks are, for example, described in the following articles:

C. Clavier: "*Side channel analysis for reverse engineering (scare)—an improved attack against a secret a3/a8 gsm algorithm*", Cryptology ePrint Archive, Report 2004/049, 2004, M. San Pedro et Al: "*FIRE: Fault Injection for Reverse Engineering*", Springer Berlin Heidelberg, 2011, pp 280-293.

In general, a side channel attack consists in measuring a physical quantity observable during the operation of the microprocessor when it executes the predetermined function attacked in order to deduce therefrom information on the operation and internal data of this predetermined function. For example, the observed parameter may be the electrical consumption or the electromagnetic radiation of the microprocessor.

The method described in US2015/0095659A1 is robust with regard to side channel attacks since the code executed for performing the predetermined function varies from one execution to another. Thus, all other things being equal, this means that the observed parameter varies unpredictably at each execution of the predetermined function.

However, by observing in the main memory, the instruction stream generated during the execution of the polymorphic machine code, an attacker may still obtain information on the operation of this predetermined function. For example, for this, the attacker may disassemble the generated instruction stream.

The prior art of WO2005/124506A2 is also known.

The invention is aimed at remedying this problem by providing a method for executing a polymorphic machine code by a microprocessor that is robust with regard to attacks by disassembling the generated instruction stream and with regard to side channel attacks.

The subject matter of the invention is therefore a method compliant with claim 1.

In the claimed method, the code executed for performing the predetermined function varies from one execution to another. Thus, the claimed method retains its robustness with regard to side channel attacks.

In addition, in the claimed method, the generated instruction stream which performs the predetermined function is present in the main memory only in encrypted form. Thus, attack attempts by disassembling instructions of the generated instruction stream are made more difficult.

In addition, the value of the initialization vector of the encryption module varies from one basic block to another basic block in the generated instruction stream. Thus, the entire generated instruction stream is not encrypted in the same way, which makes any attempt at cryptanalysis of the encrypted instruction stream recorded in the main memory more difficult.

Finally, a basic block is only decrypted if it is executed. Conversely, a basic block is never decrypted if it is not executed. The claimed method therefore avoids systematically decrypting all of the encrypted stream, which makes its execution faster.

The embodiments of this method may have one or more of the features of the method dependent claims.

The subject matter of the invention is also a polymorphic machine code for implementing the claimed method.

The subject matter of the invention is also an information recording medium comprising the polymorphic machine code.

The subject matter of the invention is also an electronic apparatus for implementing the claimed method.

The invention will be better understood on reading the description that follows, given solely by way of example and made with reference to the following figures.

In these figures, the same reference numerals are used for designating the same elements. In the remainder of this description, the features and functions well known to the person skilled in the art are not described in detail.

The following definitions are adopted in this description.

A "program" refers to a set of one or more predetermined functions that are to be executed by a microprocessor.

A "source code" is a representation of the program in a computer language, not directly executable by a microprocessor and intended to be converted by a compiler into a machine code directly executable by the microprocessor.

A program or a code is said to be "directly executable" when it is capable of being executed by a microprocessor without this microprocessor first needing to compile it by means of a compiler or to interpret it by means of an interpreter.

An "instruction" refers to a machine instruction executable by a microprocessor. Such an instruction consists of:
an opcode, or operating code, encoding the nature of the operation to be executed, and
one or more operands defining the one or more values of the parameters of this operation.

A "machine code" is a set of machine instructions. It is typically a file containing a succession of bits bearing the value "0" or "1", these bits encoding the instructions to be executed by the microprocessor. The machine code is directly executable by the microprocessor, i.e. without requiring prior compilation.

An "instruction stream" is a succession of instructions arranged one after the other and which forms, in machine code, an ordered series of bits. The instruction stream starts with an initial instruction and ends with a final instruction. With respect to a given instruction of the instruction stream, the instructions located on the side of the initial instruction are termed "upstream instructions" and the instructions located on the side of the final instruction are termed "downstream instructions". In this text, this instruction stream in memory is split into a succession of basic blocks that are immediately consecutive or separated by data blocks.

In this text, a "basic block" is a group of successive instructions in the instruction stream starting at a branch address and ending with a branch instruction. Thus, the execution of a basic block systematically starts with the execution of the instruction located at its branch address and systematically ends with the execution of the branch instruction which ends this basic block. Preferably, a basic block does not comprise branch instructions other than that located at the end of this basic block. Thus, the instructions of a basic block are systematically all read by the processor one after the other in the order that they are present in this basic block. However, a basic block may also contain one or more conditional branch instructions before its last branch instruction. The concept of basic block as defined herein applies to the parts of the instruction stream that are encrypted. If there are unencrypted parts of the instruction stream, then in these unencrypted parts, it is not necessary for a basic block to start at a branch address.

A "branch instruction" is an instruction which, when executed by the microprocessor triggers a jump to the address of another basic block in the instruction stream. This branch instruction therefore comprises at least the branch address of this other basic block. Typically, for this purpose, this instruction replaces the current value of the program counter with the value of the branch address. It is recalled that the program counter contains the address of the next instruction to be executed by the microprocessor. In the absence of a branch instruction, the program counter is incremented by 1 each time an instruction is executed. In the absence of a branch instruction, the instructions are systematically executed sequentially one after the other in the order that they are recorded in a main memory. The branch instruction may be unconditional, i.e. the jump to the branch address is systematically performed as soon as this instruction is executed. An unconditional branch instruction is, for example, the "JMP" instruction in assembler. The branch instruction may also be conditional, i.e. the jump to the branch address is triggered during its execution only if a particular condition is met. For example, a conditional branch instruction is a "JE", "JA" or "JNE" instruction in assembler. The branch instruction may also be a call to a function. In this text, the term "branch instruction" refers to both direct and indirect branch instructions. A direct branch instruction is a branch instruction which directly contains the numerical value of the branch address. An indirect branch instruction is a branch instruction to a branch address contained in a memory or a register of the microprocessor. Thus, unlike a direct branch instruction, an indirect branch instruction does not directly contain the numerical value of the branch address.

The term "downstream branch instruction" refers to an instruction which causes, when executed by a microprocessor, a jump to a downstream instruction in the instruction stream.

The term "upstream branch instruction" refers to an instruction which causes, when executed by a microprocessor, a jump to an upstream instruction in the instruction stream.

A "branch address" is the address in the main memory at which the first instruction of a basic block is located.

The execution of a function refers to the execution of the instructions performing this function.

For the sake of simplification, in this description, these instructions are not represented in binary form, but rather in a symbolic form expressed in a top-level language. In particular, the opcode is represented in a known manner by a mnemonic.

Figure 1:
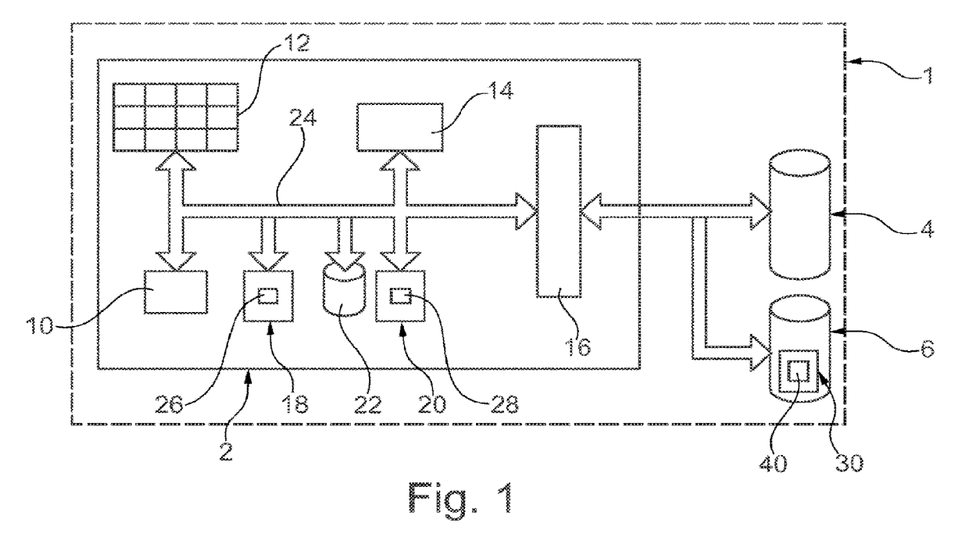
FIG. 1 is a schematic illustration of an electronic apparatus comprising a microprocessor and an information recording medium.

FIG. 1 represents an electronic apparatus 1 comprising a microprocessor 2, a main memory 4 and an information recording medium 6. For example, the apparatus 1 is a computer, a smartphone, an electronic tablet or the like.

The microprocessor 2 here comprises:
an arithmetic and logic unit 10;
a set 12 of registers;
a control module 14;
a data input/output interface 16;
a public stream encryption module 18;
a private stream decryption module 20, and
a non-volatile secure memory 22 only accessible by the modules 18 and 20.

The memory 4 is configured for storing instructions having to be executed by the unit 10. Here, the memory 4 is a non-secure memory. "Non-secure memory" refers to the fact that a user program can access the contents of this memory and read its contents. Typically, the memory 4 is a volatile memory. The program counter of the microprocessor 2 points to this memory 4. The unit 10 is notably configured for executing the instructions recorded in the memory 4, in the order in which these instructions are recorded in the memory 4, and, where appropriate, for recording the result of these instructions executed in one or more of the registers 12. Here, it is assumed that an instruction, in order to be executed by the unit 10, has to be placed in the memory 4. In this description, "execution by the microprocessor 2" and "execution by the unit 10" will be used synonymously. The memory 4 may be a memory external to the microprocessor 2 as represented in FIG. 1. In this case, the memory 4 is formed on a substrate mechanically separate from the substrate on which the various elements of the microprocessor 2 and the unit 10 are formed. However, as a variant, the memory 4 may also be an internal memory incorporated within the microprocessor 2. In the latter case, it is formed on the same substrate as the other elements of the microprocessor 2. Finally, in another configuration, the memory 4 consists of a plurality of memories, some of which are internal memories and others external memories.

The module 14 is configured for moving instructions between the set 12 of registers and the interface 16. For this purpose, the microprocessor 2 also comprises here a data exchange bus 24.

The interface 16 is notably capable of acquiring data, e.g. from the memory 4 and the medium 6 external to the microprocessor 2.

The medium 6 is also a non-secure memory. Typically, it is a non-volatile non-secure memory. For example, it is of the EEPROM or Flash type. It contains an executable code 30 here of a program executable by the microprocessor 2. This executable code 30 contains the polymorphic machine code of one or more predetermined functions. In order to simplify the illustration, only one polymorphic machine code 40 is represented in FIG. 1.

The encryption module 18 is a stream encryption module also known under the term "stream cipher", i.e. it encrypts the bits of an instruction stream as they arrive without waiting for a block of bits of a length greater than a predetermined threshold to be fully received. Typically, the predetermined threshold is strictly greater than 1 and generally greater than 32, 64 or more. Here, the encryption module 18 is a hardware encryption module formed on the same substrate or the same chip as the arithmetic and logic unit 10. For example, the module 18 is the encryption module known as "Trivium". For further information on this encryption module 18, the reader may refer to the following article: Christophe De Canniere and Bart Preneel: *"TRIVIUM Specifications"*, eSTREAM, ECRYPT Stream Cipher Project, 2006.

Thus, hereafter, only the operating principle of the module 18 is recalled. The module 18 comprises:
  a generator 26 of pseudo-random sequences,
  an initialization vector the current value of which is denoted by $IV_c$ hereafter, and
  a secret key k.

The generated pseudo-random sequence varies according to the current value $IV_c$ of the initialization vector and the secret key k. During the encryption of an instruction stream, each bit of this instruction stream entering the module 18 is combined with the last generated bit of the pseudo-random sequence. This pseudo-random sequence is lengthened by one bit each time that a bit entering the instruction stream is received. In order to combine these two bits, Trivium encryption uses the "exclusive or" operation denoted by XOR. In the course of the encryption of an instruction stream, the value of the initialization vector may be renewed, i.e. its value may be modified. On the other hand, in this embodiment, in order to simplify the description, it is assumed that the secret key k is never modified. For example, it is recorded in the memory 22 during the manufacture of the microprocessor 2. The module 18 may be called by a user program for encrypting an instruction stream with a value $IV_c$ of the initialization vector imposed by this user program. For this, the microprocessor 2 is modified so as to be able to execute during the encryption of an instruction stream:
  a renewal instruction denoted by Init(IV), and
  an encryption instruction Encrypt(m).

When the arithmetic and logic unit 10 executes the Init(IV) instruction, in response, the value IV is recorded in a register 12 or in the memory 22. The operation of this instruction during encryption and decryption is described in greater detail with reference to FIGS. 5 and 7.

When the Encrypt(m) instruction is executed by the arithmetic and logic unit 10, the bits of the word m are transmitted one after the other to the module 18 which, in response, returns the bits one after the other of a ciphertext M of the word m obtained by combining the word m bitwise with the word of the same length most recently generated by the generator 26.

The module 20 is a stream decryption module which performs the inverse operation of that performed by the module 18. It is therefore used to decrypt an instruction stream encrypted by the module 18 when it is initialized with the same initialization vector as that used by the module 18 for encrypting the same instruction stream. For this purpose, it comprises:
  its own pseudo-random sequence generator 28 identical to the generator 26,
  its own initialization vector which may take, at the same time, a value different from that of the initialization vector of the module 18, and
  the same secret key k.

Unlike the module 18, the module 20 cannot be called directly by a user program. In other words, there is no instruction that explicitly allows the decryption of an instruction to be initiated. More specifically, from the moment that an encrypted mode of the microprocessor 2 is enabled, the module 20 is systematically called for decrypting the next instruction to be executed before it is transmitted to the arithmetic and logic unit 10 to be executed therein. It is therefore not necessary to have a Decrypt(m) instruction for explicitly calling the module 20 for decrypting the message m.

Figure 2:
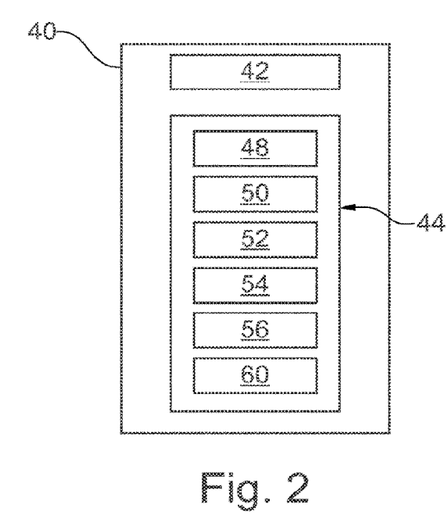
FIG. 2 is a schematic illustration of a polymorphic machine code capable of being executed by the apparatus in FIG. 1.

FIG. 2 represents in more detail the polymorphic machine code 40 of a predetermined function intended to be executed by the microprocessor 2. For the general principles regarding the structure and operation of such a polymorphic machine code 40, the reader may refer to the application US2015/0095659A1. Consequently, only the details necessary for understanding the invention are described more specifically.

The code 40 comprises a succession of instructions capable of being executed by the microprocessor 2. Thus, this code 40 is characterized by the instructions recorded on the medium 6.

More specifically, the code 40 comprises:
  an instruction block 42 for acquiring a numerical value capable of varying from one execution to the next of the code 40, and
  at least one instruction block, termed a specific generator 44, capable of generating, when executed by the microprocessor 2, an instruction stream, referred to as target instructions, which performs the predetermined function when these target instructions are in turn executed by the microprocessor 2.

Here, the block 42 obtains a random number as a numerical value capable of varying from one execution to another of the code 40. For example, the block 42 acquires the random number from a source of pseudo-random numbers. This random number is a pseudo-random integer greater than or equal to 0 and less than or equal to a threshold "RAND_MAX".

The generator 44 here comprises:
  an instruction block encoding a plurality of coding variants 48 of the predetermined function,
  selection instructions 50;
  a register allocation module 52;

an instruction translation module 54;

an instruction scheduler module, subsequently referred to as a "scheduler 56", and an instruction block 60, referred to as a control block, capable of placing the generated target instruction stream in the memory 4.

The selection instructions 50 and the modules 52, 54, 56 are, for example, identical to those already described in the application US2015/095659A1. Thus, only some explanations regarding their operation are recalled here.

Each of the variants 48 generates, when executed by the microprocessor 2, a specific stream of target instructions performing the predetermined function. Each coding variant is thus capable of producing a specific instruction stream which is different from the stream of target instructions generated by the other coding variants but which are all functionally equivalent. Two instruction streams are termed functionally equivalent if they systematically produce, when executed by the microprocessor 2, the same result from the same input data. Each of these specific streams of target instructions is distinguished from the other by at least:

a different opcode, or a different literal value, or a different number of instructions.

The instructions 50 make it possible to choose, from the plurality of variants 48, according to the random number acquired by the execution of the instructions 42, a coding variant to be executed for generating the specific stream of target instructions.

The module 52 is an instruction block configured for allocating, when executed by the microprocessor 2, one or more registers of the set 12 for executing instructions on the unit 10. Such a module 52 is known per se. This module 52 performs this assignment notably according to a value of a random number. For example, this module 52 comprises instructions capable of modifying, according to the value of the random number, the value of an operand of an instruction corresponding to the identifier of a memory register of the set 12. Here, for this purpose, the module 52 comprises an instruction block for acquiring a value of a random number. For example, this module 52 is formed by implementing the functionalities of the register renaming method described in the document WO02/054228 A1. By way of example, this module 52 associates a register "r5" of the set 12 with a register identifier "A" if the value of the random number is even and, if not, it associates it with a register "r9".

The module 54 is an instruction block configured for generating the target instructions from the coding variants 48.

The scheduler 56 is an instruction block configured for modifying, according to a random number, the order in which the target instructions have to be executed by the unit 10. This scheduler 56 receives as input:

a value of a random number, and one or more instructions generated by the module 54 and to which the module 52 has assigned one or more registers.

This scheduler 56 outputs the target instructions in the order in which they have to be executed by the microprocessor 2. These target instructions placed one after the other in the order in which they have to be executed are recorded, by the scheduler 56, in a queue. Subsequently, this succession of target instructions placed one after the other in the order in which they have to be executed forms the instruction stream to be executed for performing the predetermined function. This queue is formed from internal registers of the microprocessor 2. For example, the queue is formed using a plurality of registers of the set 12. At this stage, the generated instruction stream is not encrypted.

The control instruction block 60 is responsible here for encrypting each instruction in the instruction stream before recording them in the memory 4. The operations performed by the block 60, when executed by the microprocessor 2, are described in more detail with reference to FIGS. 3 to 7.

For example, the code 40 is constructed using a modified version of the "deGoal" software. This "deGoal" software notably makes it possible to create a polymorphic machine code generator. The operating principle of this software is described in the following articles:

Henri-Pierre Charles, Damien Couroussé, Victor Lomüller, Fernando A Endo, and Rémi Gauguey "deGoal a Tool to Embed Dynamic Code Generators into Applications," in Compiler Construction, 2014, vol. 8409.

Damien Couroussé, Victor Lomüller, and Henri-Pierre Charles "Introduction to Dynamic Code Generation—an Experiment with Matrix Multiplication for the STHORM Platform", in Smart Multicore Embedded Systems, Springer Verlag, 2013, pp. 103-124.

In these articles, the generator 44 is referred to under the term "compilette" and the target instruction stream is referred to under the term "kernel".

This "deGoal" software is, however, modified so that the generation of the code:

does not depend on data input for the predetermined function to be executed, depends on one or more random numbers, and encrypts the generated instruction stream recorded in the memory 4.

Figure 3:
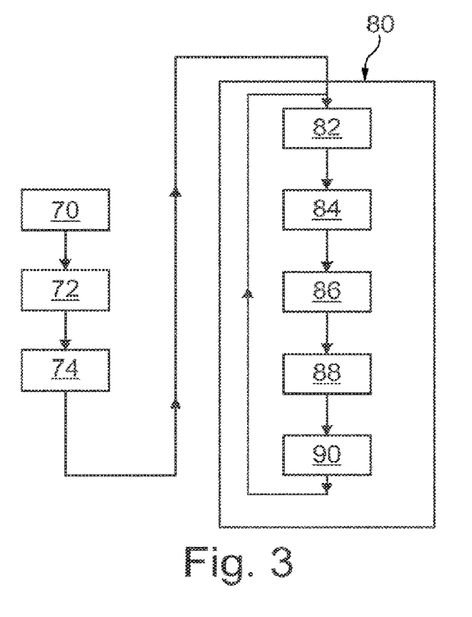
FIG. 3 is a flow chart of a method for constructing and executing the polymorphic machine code in FIG. 2.

An example of generating and executing the code 40 will now be described in more detail with reference to the flowchart in FIG. 3.

During a step 70, the program 30 having to be executed is automatically acquired by a computer in order to be compiled therein. This computer may be the apparatus 1 or be an apparatus distinct from the apparatus 1.

Here, the program 30 comprises a predetermined function to be executed on the microprocessor 2 in a secure manner and, notably, so as to be as resistant as possible against side channel attacks and against attacks by disassembly of instructions in the memory 4. Often, this predetermined function is a cryptographic primitive such as the encryption algorithm known as the "Advanced Encryption Standard" (AES). However, in order to simplify the explanations, subsequently, the description is given in the particular case where this predetermined function is a function which calculates the sum of the positive integers included between 1 and N. The explanations given in this particular case apply to any other predetermined function.

In this example, during step 70, the predetermined function is first acquired in the form of a source code then compiled to form the polymorphic machine code 40. This step 70 is, for example, performed as described in the application US2015/095659A1.

At the end of this step, during a step 72, the code 40 is encrypted. For example, the code 40 is encrypted by implementing a stream encryption. Here, in order to simplify the execution of the code 40 on the microprocessor 2, the code 40 is encrypted by implementing a stream encryption identical to that which will be used during the execution of the code 40 by the microprocessor 2. For this purpose, a stream encryption module identical to the module 18 is used. In particular, the code 40 is encrypted by using the same secret key k as that used by the modules 18 and 20 and recorded in the secure memory 22. This stream encryption implemented during step 72 is described in detail farther on in the particular case where it is used for encrypting the instruction stream generated by the execution of the generator 44.

During a step 74, the program 30 and the encrypted code 40 are recorded on the medium 6.

A phase 80 of execution of the program 30 and of the code 40 by the microprocessor 2 may then begin.

First of all, during a step 82, just before the start of the execution of the code 40, the microprocessor 2 enters an operating mode referred to as "encrypted mode". When the microprocessor 2 is in this mode, each instruction to be executed is first decrypted before being executed. Conversely, in an operating mode referred to as "non-encrypted mode", the instructions to be executed are loaded from the memory 4 to the microprocessor 2 and are executed without first decrypting them. For switching between the encrypted and non-encrypted modes, the microprocessor 2 is capable of:

executing an Enable_Encrypt instruction which switches the microprocessor 2 from the non-encrypted mode to the encrypted mode immediately after the end of the basic block in the course of execution, and executing a Disable_Encrypt instruction which switches the microprocessor 2 from the encrypted mode to the non-encrypted mode immediately after the end of the basic block in the course of execution.

The Enable_Encrypt instruction may be found at any location of the basic block in the course of execution, and be executed at any time in the course of the execution of this basic block. Switching to the encrypted mode always takes place during the execution of the next branch instruction. It is therefore not necessary for the Enable_Encrypt instruction to be located immediately before the end of the basic block in the course of execution.

For example, here, the program 30 comprises an Enable_Encrypt instruction and an Init($IV_0$) instruction just before the start of the code 40 and a Disable_Encrypt instruction just at the end of the code 40. Thus, when passing into the encrypted mode, the initialization vector of the module 20 is initialized with the value $IV_0$.

Then, during a step 84, the encrypted code 40 is transferred into the memory 4 and a step 86 of executing the code 40 begins.

During step 86, each time the microprocessor loads an instruction to be executed from the memory 4, the module 20 first decrypts this instruction then the decrypted instruction is transmitted to the arithmetic and logic unit 10 which executes it. Here, the decryption of the instructions of the code 40 is implemented as described in more detail in the case of the decryption of the instruction stream generated by the generator 44.

In particular, during step 86, the microprocessor 2 executes the generator 44. In response, the generator 44 generates an instruction stream capable, when executed in turn by the microprocessor 2, of performing the predetermined function.

The generation of this instruction stream proceeds as described in the application US2015/0095659A1. In particular, during the generation of the instruction stream, the generator 44 randomly selects a coding variant of the instruction stream from a plurality of possible variants 28. Thus, from one execution to the next, the coding of the generated instruction stream varies, which makes any attempt at attack by observing side channels difficult. In addition, here, the registers used and the scheduling of the instruction stream vary randomly at each execution of the generator 44. This therefore makes cryptanalysis of the predetermined function by observing side channels even more difficult.

After the execution of the scheduler 56, the generated instruction stream is recorded in a queue formed in the set 12 of registers. In this queue, the instructions in the generated instruction stream are "in clear", i.e. they are not encrypted and therefore directly executable by the arithmetic and logic unit 10.

The execution of the control block 60 then leads to encrypting, as they are generated, the instructions in the instruction stream contained in the queue, by implementing a stream encryption executed by the module 18, then transferring the newly encrypted instructions to the memory 4. Accordingly, the instruction stream recorded in the memory 4 is encrypted, making any attempt at cryptanalysis by disassembling the instructions of the generated instruction stream more difficult. The encryption of the generated instruction stream is described in more detail with reference to FIG. 5.

Then, during a step 88, the encrypted instruction stream contained in the memory 4 is executed by the microprocessor 2.

During this step 88, each time the microprocessor 2 loads an instruction of the encrypted instruction stream from the memory 4, it is first decrypted by the module 20 then executed by the arithmetic and logic unit 10. The decryption of instructions of the encrypted instruction stream is described in more detail with reference to FIG. 7.

Typically, the code 40 ends with the Disable_Encrypt instruction then a branch instruction. Thus, when the execution of the code 40 ends, during a step 90, the microprocessor 2 returns into the non-encrypted mode then continues the execution of the program 30.

During the same execution of the program 30, the code 40 may be executed multiple times. Thus, during the same execution of the program 30, steps 82 to 90 may be repeated multiple times.

The encryption and decryption of the instruction stream generated by the execution of the generator 44 will now be described in the particular case of the instruction stream represented in FIG. 4.

Figure 4:
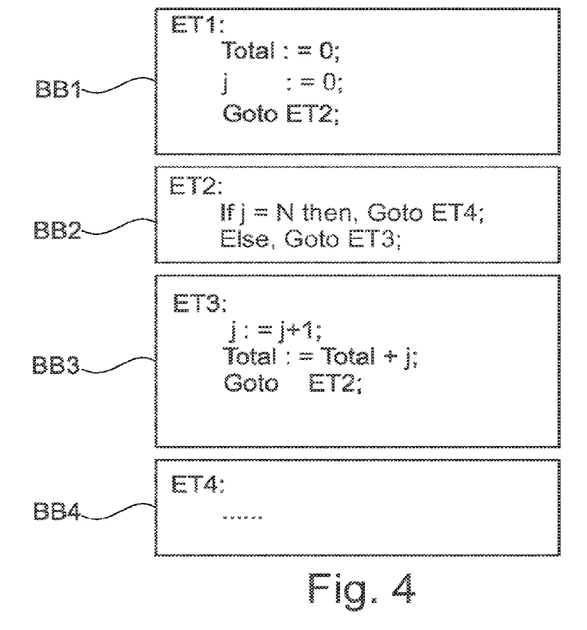
FIG. 4 is an illustration, in high-level language, of the code of a predetermined function.

FIG. 4 represents the instruction stream of the predetermined function written in a high-level language such as, for example, in C. The symbols "ET1", "ET2", "ET3" and "ET4" are labels to which a branch instruction may return. The instruction stream is divided into a succession of basic blocks. In FIG. 4, the various basic blocks of the predetermined function bear the references BB1, BB2, BB3 and BB4. In this figure, the branch instructions correspond to the instructions "Goto ET2", "If i=N, then Goto ET4 Else Goto ET3" and "Goto ET2". More specifically, here the instruction "Goto ET2" is an unconditional downstream branch instruction. The instruction "If i=N, then Goto ET4 Else Goto ET3" corresponds to a conditional downstream branch instruction "If i=N, then Goto ET4" and to a conditional upstream branch instruction "If i≠N, then Goto ET3". Hereafter, it is therefore processed as a succession of two branch instructions. The instruction "Goto ET2" is an unconditional upstream branch instruction. Each basic block ends with a branch instruction and comprises at most only a single unconditional branch instruction. Between two immediately successive basic blocks in the generated instruction stream, it is normally pointless to add an unconditional downstream branch instruction to the immediately consecutive basic block. However, in order to systematically respect the syntax of an encrypted basic block as defined in this application, the generator 44 is capable of adding, if this is not already present, an unconditional branch instruction to the next basic block at the end of the preceding basic block. Indeed, as explained farther on, in the encrypted mode, the branch instruction is used by the control block 60 for identifying the end of a basic block. It must therefore be systematically present at the end of each basic block in the cases where:
(1) the generated basic block will be encrypted, or
(2) the basic block contains an Enable_Encrypt or Disable_Encrypt instruction in order to ensure the change of execution mode when passing on to the next basic block.
It is therefore for this reason that the block BB1 ends with an unconditional branch instruction to the block BB2.

There are several possibilities for systematically introducing a branch instruction at the end of a basic block. For example, in a first embodiment, when the control block 60 encounters the start of a next basic block without the end of the preceding basic block containing a branch instruction, it automatically adds into the instruction stream and at the end of the preceding basic block, an unconditional branch instruction to the next basic block. The start of a basic block is detected by the presence of a label which allows jumping directly from another basic block of the code 40 to this basic block.

The symbol " . . . " in the block BB4 indicates that the representation of the instructions in this block has been omitted.

Note that it is only a generic description of the predetermined function. The specific instruction stream used for performing this predetermined function is known only at the time of the execution of the generator 44 by the microprocessor 2.

Figure 5:
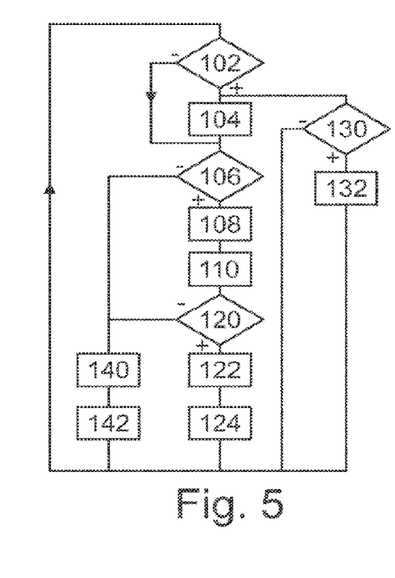
FIG. 5 is a flow chart of a method of stream encryption implemented in the method in FIG. 3.

FIG. 5 depicts a method of stream encryption of the instruction stream generated by the execution of the generator 44. This method is suited to the case where the basic blocks to be encrypted do not comprise any indirect branch instruction or any function call. In this method, the control block 60 processes the successive instructions of the generated instruction stream in order from the initial instruction to the final instruction of this stream.

More specifically, initially, the control block 60 initializes the value of the initialization vector of the module 18 with the value $IV_0$ recorded in the set 12 or in the memory 22 by the execution of the instruction $Init(IV_0)$. At this stage, the value of the initialization vector of the module 18 is therefore equal to $IV_0$.

Then, the control block 60 processes the instructions of the generated instruction stream contained in the register set 12 one after the other.

During a step 102, each time a new instruction is processed by the control block 60, it checks whether the address of this instruction is a branch address. The address of the instruction and the branch address are relative addresses with respect to the start of the generated instruction stream. For example, each address is an order number of the instruction counted from the initial instruction of the generated instruction stream.

During a step 104, if the address of the processed instruction corresponds to a branch address, the control block 60 obtains a numerical value $IV_i$ that it associates with this branch address. Typically, this numerical value $IV_i$ is different, or almost always different, from the numerical values associated with the other branch addresses. For example, for this, the numerical value $IV_i$ is a random number obtained, for example, in the same way as during step 86.

Then, this branch address is associated with this numerical value $IV_i$. For example, this branch address is recorded in a table TA associated with the numerical value $IV_i$. Here, by way of illustration, the same table TA is also used for associating the label corresponding to this branch address and the numerical value of this branch address. It is recalled here that a branch address is a numerical value while the label is a symbol identifying the branch address.

Finally, the control block 60 transmits an $Init(IV_i)$ instruction to the arithmetic and logic unit 10. In response, the arithmetic and logic unit 10 executes it, causing the immediate replacement of the preceding value of the initialization vector of the module 18 with the value $IV_i$. The value $IV_i$ therefore becomes the current value $IV_c$. Thus, all the following instructions of the basic block which start at this branch address are encrypted using the value $IV_i$ for the initialization vector of the module 18.

Then, in a step 106, the control block 60 checks whether the processed instruction is a branch instruction.

If so, it proceeds to a step 108. During step 108, the control block 60 reads the label to which the branch instruction redirects. For example, here, the read label is one of the labels ET1, ET2, ET3 or ET4. If the read label is already associated in the table TA with a branch address, then the label is replaced, in the branch instruction, by the corresponding branch address associated therewith. This case corresponds to the case of an upstream branch instruction. In addition, in the case of an upstream branch label, the branch address is already associated with a value $IV_i$ of the initialization vector.

If the read label is not already associated in the table TA with a branch address, then that means that the processed branch instruction is a downstream branch instruction. If the read label is not already associated with a numerical value $IV_i$ in the table TA, then the control block 60 obtains a new numerical value $IV_j$ and associates the read label with this new numerical value obtained in the table TA. For this, for example, the control block 60 obtains the new value $IV_j$ as described for step 104.

Then, the control block 60 adds an $Init(IV_j)$ instruction into the generated instruction stream, just before this branch instruction.

Once step 108 ends, during a step 110, the added $Init(IV_j)$ instruction is then transmitted to the module 18, which encrypts it using the current value $IV_c$ of the initialization vector of this module 18. Once encrypted, the $Init(IV_j)$ instruction Is recorded in the memory 4 just after the preceding instruction encrypted by the module 18.

In the case of the instruction "if i=N then Goto ET4, Else Goto ET3", this is processed as the succession of two conditional branch instructions. In this case, just before each conditional branch instructions, an $Init(IV_j)$ instruction specific to the branch address thereof is added. For this, for example, steps 108 and 110 are performed for each branch address.

Then, during a step 120, the control block 60 checks whether the processed instruction is a downstream branch instruction. Indeed, in the case of an upstream branch instruction, the numerical value of the branch address that has to be substituted for the label is immediately available in the table TA so that the upstream branch instruction can be immediately encrypted by the module 18. In the case of a downstream branch instruction, the numerical value of the branch address corresponding to the label is not immediately determinable. In particular, in the case of a polymorphic machine code, it depends on the coding variants selected or which will be selected for the basic blocks located downstream. However, the number of instructions of these basic blocks varies or may vary, according to the variant selected.

Thus, when the control block 60 encounters a downstream branch instruction, it cannot immediately replace the label with the numerical value of the branch address. For example, this problem arises in the case of the instruction "If i=N then Goto ET4". Indeed, at the time of the encryption of this instruction, the branch address corresponding to the label ET4 is not immediately determinable.

If the branch instruction is a downstream branch instruction, during step 122, the control block 60 reserves in the memory 4 at the location where this downstream branch instruction has to be recorded a space of the same size as this branch instruction.

Then, during a step 124, a recall function Recall($IV_c$, $n_o$) is associated with the label ET4. This Recall($IV_c$, $n_o$) function is parameterized by:
  the current value $IV_c$ of the initialization vector of the module 18, and
  by a number $n_o$ identifying the position of the group of bits of the pseudo-random sequence generated by the generator 26 to be combined with this downstream branch instruction in order to obtain its ciphertext.

This ciphertext must be identical to that which would have been obtained if the branch address had been immediately determinable at the time of seeking to encrypt this downstream branch instruction for the first time. Here, the number $n_o$ is the order number of this downstream branch instruction counted from the first encrypted instruction using the value $IV_c$ of the initialization vector, i.e. from the first instruction of the basic block in the course of encryption.

Here, it is assumed that all the instructions have the same length and that this length is equal to the length of a word. For example, the length of a word is constant and equal to 32 bits. Accordingly, based on knowing the number $n_o$, it is possible to determine the position, in the generated pseudo-random sequence, of the 32 bits to be combined with this downstream branch instruction for encrypting it.

For example, each recall function is associated with a label thanks to a table that contains on the same row the label and the address of the recall function to be called.

In parallel, during a step 130, each time a new label is associated with the numerical value of a branch address in the table TA during step 104, the control block 60 checks whether this new label corresponds to a label associated with one or more recall functions.

If so, during a step 132, each recall function associated with this new label is executed. During the execution of this recall function, the label present in the branch instruction which could not hitherto be encrypted is replaced by the numerical value of the branch address which is now known. Then, the recall function renews the numerical value of the initialization vector of the module 18 by replacing it with the value of its parameter $IV_c$. Then $n_o$-1 words are transmitted to the module 18 so that the pseudo-random sequence regains the same state it was in just before the encryption of the downstream branch instruction. For example, the control block 60 achieves this by calling the Encrypt(m) function ($n_o$-1) times, where m is a randomly or pseudo-randomly drawn 32-bit word, for example. Then, the control block 60 calls the Encrypt(m) function in which the word m this time is equal to the downstream branch instruction in which the label has been replaced by the branch address. In response, the module 18 returns the encrypted downstream branch instruction to the control block 60. The control block 60 then records in the space of the memory 4 reserved for this purpose the encrypted downstream branch instruction thus obtained.

If during step 106 the processed instruction is not a branch instruction or if during step 120 the processed instruction is not a downstream branch instruction, then the method continues with a step 140 of encrypting the processed instruction. More specifically, the processed instruction is transmitted to the module 18, which encrypts it using the current value $IV_c$ of the initialization vector of the module 18.

Then, during a step 142, the control block 60 records the instruction thus encrypted in the memory 4 following the preceding instruction in the instruction stream. In the case where the processed instruction is a branch instruction, the encrypted branch instruction is therefore recorded in the memory 4 immediately after the Init($IV_j$) instruction added before this branch instruction.

Figure 6:
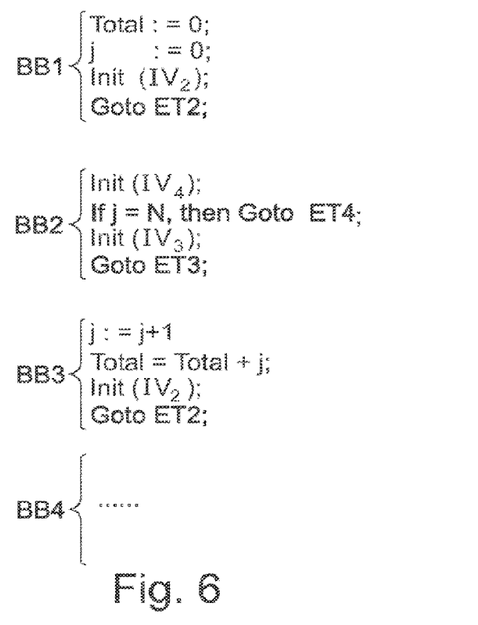
FIG. 6 is an illustration in high-level language of the predetermined function in FIG. 4 after its conversion by the method in FIG. 5.

FIG. 6 represents, in the C language, the same instruction stream as that represented in FIG. 4 but after the Init($IV_j$) instructions have been added into this instruction stream following the principle described in the method of FIG. 5. In this figure, the various values used for renewing the initialization vector of the module 18 are denoted by $IV_2$, $IV_3$ and $IV_4$.

The execution of the encrypted instruction stream recorded in the memory 4 will now be described with reference to the method of FIG. 7.

During a step 150, just before the start of the execution of the encrypted instruction stream, the value of the initialization vector of the module 20 is initialized with the same value as that which the module 18 had at the start of the encryption of this instruction stream. For example, for this, the microprocessor 2 successively executes an Enable_Encrypt instruction, an Init($IV_0$) instruction then a branch instruction to the branch address of the first basic block in the encrypted instruction stream. The Enable_Encrypt instruction returns the microprocessor 2 into its encrypted mode if it had, in the meantime, switched to the non-encrypted mode.

Then, during an operation 152, the microprocessor 2 loads from the memory 4, one after the other and in the order in which they are recorded, the encrypted instructions of the instruction stream.

In the encrypted mode, each time an instruction is loaded, it is first transmitted to the module 20 which decrypts it. Then, the decrypted instruction is transmitted without passing through the memory 4, to the arithmetic and logic unit 10 which executes it.

When the arithmetic and logic unit 10 executes the Init($IV_j$) instruction, this immediately loads the value $IV_j$ in a register of the set 12 or in the memory 22. Then, each time the arithmetic and logic unit executes a branch to a branch address, the value of the initialization vector of the module 20 is replaced with the value $IV_j$ recorded in the register of the set 12 or in the memory 22 by the last executed Init($IV_j$) instruction. Thus, immediately after a jump to another basic block, all the following instructions are decrypted with this new value $IV_j$ of the initialization vector of the module 20 until the microprocessor executes the next branch instruction.

Figures 7, 8:
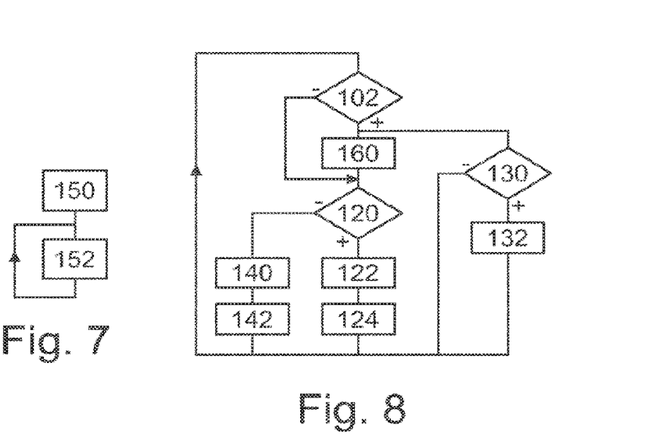
FIG. 7 is a flow chart of a method of stream encryption implemented in the method in FIG. 3.
FIGS. 8, 9 and 10 are other possible embodiments of a method of stream encryption that can be used in the method in FIG. 3.

FIG. 8 represents an alternative stream encryption method capable of being implemented in place of the method of FIG. 5. This method, unlike that of FIG. 5, works even if the basic blocks to be encrypted comprise indirect branch instructions and/or function calls. This method is identical to that of FIG. 5 except that step 104 is replaced by a step 160 and steps 106, 108 and 110 are omitted.

Step 160 is identical to step 104 except that the control block 60 inserts the Init($IV_j$) instruction at the start of the basic block and records this Init($IV_j$) instruction in clear in the memory 4 at the location corresponding to the branch address of the basic block. Thus, each basic block starts with a renewal instruction in clear and the rest of the instructions of this basic block are encrypted using the value $IV_j$ contained in this renewal instruction.

During the execution of the encrypted instruction stream using the method of FIG. 8, the decryption takes place as described with reference to FIG. 7 except that, each time an instruction is loaded, the microprocessor 2 first checks whether it is a renewal instruction. If so, it does not perform the decryption of this renewal instruction and transmits it immediately to the arithmetic and logic unit 10 which executes it immediately. In this embodiment, the execution of the Init($IV_j$) instruction immediately replaces the current value $IV_c$ of the initialization vector of the module 20 with the new value $IV_j$. Thus, unlike the previous embodiment, in this embodiment, it is not the execution of a branch instruction which triggers the renewal of the value of the initialization vector of the module 20. In addition, in this embodiment, each renewal instruction is systematically located at the start of a basic block and not systematically located before a branch instruction.

Figure 9:
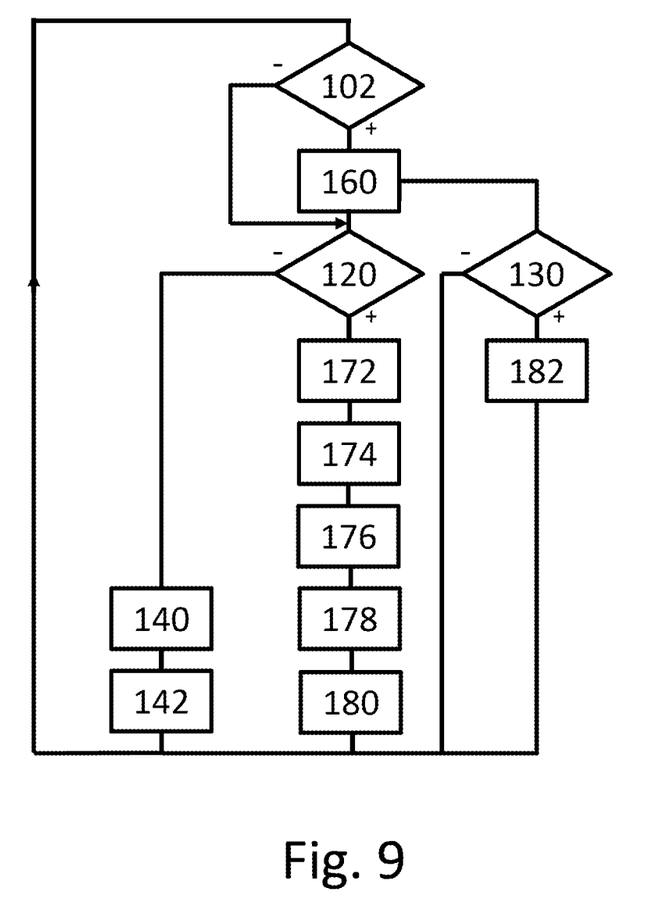

FIG. 9 represents a stream encryption method capable of being implemented in place of the method of FIG. 8. This method is identical to the method of FIG. 8 except that:
- steps 122 and 124 are replaced by steps 172 to 180, and
- step 132 is replaced by a step 182.

During step 172, the control block 60 inserts a downstream basic block into the instruction stream immediately after the current basic block and before the next basic block. Thus, the branch address of this downstream basic block is known. In addition, the downstream basic block has a size known in advance since it systematically comprises the same number of instructions. The inserted downstream basic block starts with a renewal instruction and ends with an identical copy of the processed downstream branch instruction. The renewal instruction of the downstream basic block is generated, for example, in the same way as during step 160.

During a step 174, the downstream branch instruction of the processed basic block, i.e. of the basic block located just before the inserted downstream basic block, is replaced by an unconditional branch instruction to the branch address of the downstream basic block.

During a step 176, this unconditional branch instruction is transmitted to the module 18 which encrypts it. The control block 60 then records the unconditional branch instruction in the memory 4 just after the last encrypted instruction recorded in the memory 4. Thus, the encrypted unconditional branch instruction is recorded in the place that the downstream branch instruction would have had to occupy.

During a step 178, the control block 60 then reserves a space in the memory 4, following the encrypted unconditional branch instruction, the size of which is greater than or equal to the size of the inserted basic block.

Finally, during a step 180, the control block 60 associates a Recall( ) function with the label of the processed downstream branch instruction.

Then, the method continues with the processing of the first instruction of the basic block located immediately after the downstream basic block. Thus, at this stage, the downstream basic block is not encrypted.

During step 182, the control block 60:
- replaces the label contained in the downstream branch instruction with the branch address which is now known, then
- encrypts the downstream basic block.

For encrypting the downstream basic block, the microprocessor 2 starts by executing the Init($IV_j$) instruction located at the start of this downstream basic block. Then, the downstream branch instruction, in which the label has been replaced by the numerical value of the corresponding branch address, is encrypted using the value $IV_j$ of the initialization vector of the module 18.

Finally, the downstream basic block containing the Init ($IV_j$) instruction in clear and the encrypted downstream branch instruction is recorded in the memory 4 in the space reserved for this purpose.

The execution and decryption of the encrypted instruction stream obtained with the method of FIG. 9 is identical to that described in the case of FIG. 8.

In the embodiment in FIG. 9, the Recall( ) function does not need to be parameterized by a value $IV_c$ of the initialization vector and by a number $n_o$ as in the previous embodiment.

Figure 10:
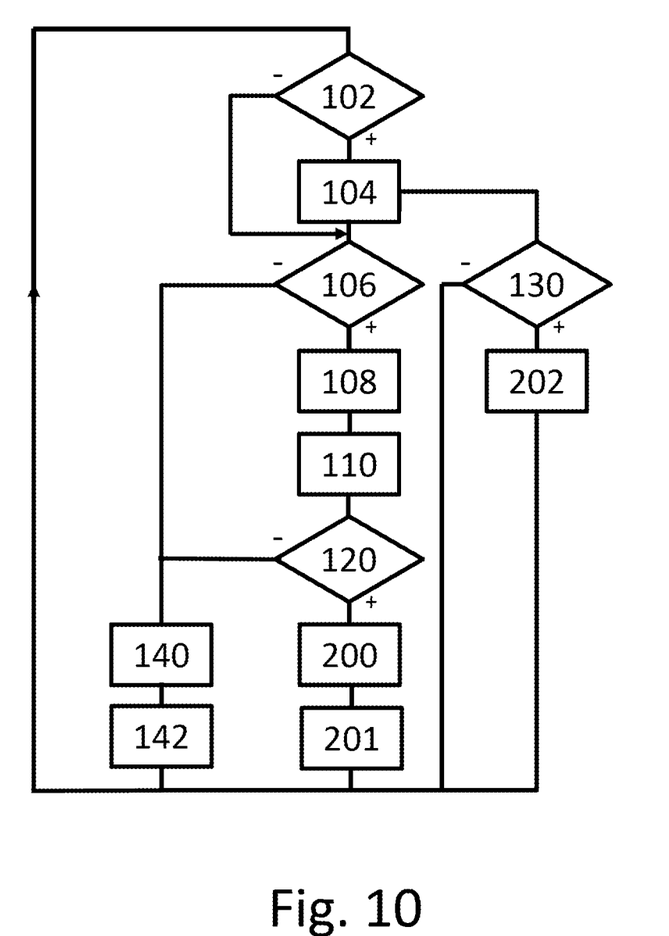

FIG. 10 represents a stream encryption method capable of being used in place of the method of FIG. 5 or 8. This method exploits the fact that the stream encryption operation implemented is a homomorphic function with respect to the XOR operation. In other words: Encrypt(m) XOR Encrypt(r)=Encrypt(m XOR r), where Encrypt( . . . ) is the encryption function executed by the module 18 with an initialization vector and a given secret key.

For example, the encryption method of FIG. 10 is identical to the method of FIG. 5 except that:
- steps 122 and 124 are replaced by steps 200 and 201, respectively, and
- step 132 is replaced by a step 202.

During step 200, the control block 60 replaces the downstream branch instruction with a ciphertext R obtained by encrypting a known word r. For example, 30 for this, the control block 60 transmits the word r to the module 18 and obtains the word R in return. Thus R=Encrypt(r). The word R is the same size as the encrypted downstream branch instruction. Then, the word R is recorded in the memory 4 in place of the downstream branch instruction to be encrypted.

Step 201 is identical to step 124 except that the recall function associated with the label corresponding to the branch address comprises an additional parameter, namely the value of the word r used for generating the ciphertext R.

During step 202, the execution of the recall function causes:
a) the replacement, in the downstream branch instruction, of the label with the numerical value of the corresponding branch address, the branch instruction parameterized by the branch address then forms a word i,
b) the determination of a word x such that x XOR r=i,
c) initialization of the module 18 with the value $IV_c$ of the parameter of the recall function,
d) the transmission of $n_o$-1 words to the module 18, then
e) the transmission of the determined word x to the module 18 which returns, in response, the ciphertext X of the word x,
f) the combination of the ciphertexts X and R in order to obtain the ciphertext I of the downstream branch instruction according to the following relationship: I=X XOR R, and
g) the recording of the ciphertext I in the memory 4 in place of the ciphertext R.

The operations c) and d) above have already been described in detail with reference to step 132.

During the operation f), the relationship X XOR R may also be written as follows: Encrypt(x) XOR Encrypt(r)=Encrypt(x XOR r)=Encrypt(i). It is therefore clear that this relationship makes it possible to obtain the ciphertext I without ever sending the downstream branch instruction to the module 18.

Variant of the Polymorphic Machine Code

Methods other than that described in the application US2015/0096569A1 are possible for generating the polymorphic machine code. For example, another method is described in the article by Giovanni Agosta et al., "A code morphing methodology to automate power analysis countermeasures", Proceedings of the 49th Annual ACM/IEEE Design Automation Conference (DAC'12), pages 77-82, June 2012.

The different variants described at the end of the application US2015/0096569A1 may also be adapted and combined with the embodiments described here.

The module 52 and/or the scheduler 56 may be omitted. In this case, the allocation of the registers and/or the order of the instructions of the generated instruction stream does not vary according to a random number.

It is not necessary to randomly or pseudo-randomly draw the numerical value which is used for selecting the coding variant 28. For example, as a variant, this numerical value depends on the conditions in which the code 40 is executed. For example, this numerical value depends on the temperature of the microprocessor, the start-up time of the apparatus 1 or any other parameter that may vary from one execution of the code 40 to the next. This numerical value may also vary according to the context in which the code 40 is executed such as according to the amount of available memory, the frequency of the microprocessor, the type of operating system or the like.

As a variant, the code 40 and, in particular, the generator 44 are not encrypted.

In another embodiment, only the generator 44 is encrypted. On the other hand, the instruction stream generated by this generator 44, when executed, is not encrypted.

It is also possible to stack the generators. For example, a first code generator generates the code of a second generator which itself generates, when executed by the microprocessor 2, the code of a third generator which, when executed, generates the instruction stream that performs the predetermined function.

In one variant, the algorithm used to encrypt the code 40 is different from that used for encrypting the instruction stream generated by the generator 44. For example, the instructions of the generator 44 are encrypted by implementing a stream encryption algorithm other than that used for encrypting the instruction stream generated by this generator 44. In another variant, the instructions of the generator 44 are encrypted by implementing a block encryption algorithm and not a stream encryption algorithm.

Variant of the Encryption and Decryption Module

As a variant, the bitwise combination of the generated instruction stream with the pseudo-random sequence is carried out by implementing an operation other than the XOR operation. For example, the operation used is an addition operation between two bytes modulo 256.

Other stream encryption methods may be used in place of Trivium. For example, the AES (Advanced Encryption Standard) algorithm in CBC (Cypher Block Chain) mode or the Grain/Mickey method where the RC4 algorithm may be used in place of Trivium.

The modules 18 and 20 may also be replaced by software modules.

Variant in the Generation of the Instruction Stream

The space reserved in the memory 4 for recording therein the encrypted downstream branch instruction later may also have a size strictly greater than the size of this encrypted branch instruction.

As a variant, the secret key k may be modified between two executions of the code 40 or in the course of the same execution of the code 40. For example, a plurality of secret keys $k_1$ to $k_n$ are recorded in the memory 22. Each key $k_i$ is associated with an identifier $Ik_i$. Then, the microprocessor is modified, in response to the execution of an Enable_Encrypt ($Ik_i$, IV) instruction, for replacing the secret key currently used by the modules 18 and 20 with the new key $k_i$ and the current value $IV_c$ of the initialization vector with the value IV.

In another embodiment, it is possible at times to disable the encryption of the generated instruction stream. For this, the microprocessor 2 is modified, in response to the execution of a Disable_Encrypt instruction, for disabling the encryption of the instruction stream. For example, for this, the Disable_Encrypt instruction is automatically added into the instruction stream just before the part of this instruction stream that it is not wanted to encrypt. Then, the Disable_Encrypt instruction is processed during the encryption and decryption in a similar way to that described for the $Init(IV_j)$ instruction.

By combining Enable_Encrypt and Disable_Encrypt instructions in the same instruction stream, it is possible to encrypt only certain parts of the instruction stream and leave other parts of this instruction stream in clear. Typically, the $Init(IV_j)$ and Encrypt(m) functions are then accessible only when the encryption of the instruction stream is enabled.

As a variant, the unconditional branch instructions to a next basic block are directly encoded in each of the variants 48, so that the control block 60 never needs to add such an unconditional branch instruction into the generated instruction stream for marking the end of a basic block.

As a variant, step 110 of encrypting the $Init(IV_j)$ instruction is omitted. In this case, this instruction is recorded in clear in the memory 4. During the execution of the encrypted instruction stream recorded in the memory 4, each time an instruction is loaded, the control block 60 then checks whether it is an $Init(IV_j)$ instruction. If so, this instruction is sent directly to the arithmetic and logic unit 10 to be executed therein without first being decrypted. Otherwise, the instruction is decrypted before being sent to the arithmetic and logic unit 10.

In the method of FIG. 8, the recall function may be parameterized with the value to be used for the initialization vector when encrypting the downstream basic block. In this case, a renewal instruction may be placed just before the branch instruction of the preceding block, as described in the embodiment of FIG. 5.

Advantages of the Embodiments Described

The encryption of the instructions of the specific generator recorded in the main memory makes it more difficult to obtain information on the instruction stream generated by the execution of this specific generator. Indeed, in order to obtain such information, it is no longer possible to obtain it by simply disassembling the instructions of this specific generator in the main memory since they are encrypted. This therefore enhances security.

The addition of the renewal instruction at the start of each basic block makes it possible to encrypt and decrypt a generated instruction stream comprising indirect branch instructions or function calls.

The fact that the renewal instruction, which makes it possible to determine the value of the initialization vector necessary for decrypting the next basic block to be executed, is encrypted in the preceding basic block makes it necessary to decrypt the basic blocks in the order of their execution. However, the order in which the different basic blocks are executed is only known in the course of the execution of the predetermined function. Accordingly, the instruction stream may only be decrypted at the same time that it is executed, which makes attack attempts by disassembling instructions in this instruction stream more difficult.

The fact of using a simple bitwise combination for encrypting and decrypting the instruction stream makes it possible to substantially speed up the execution of the encryption and decryption operations by the microprocessor without, however, compromising the security of this encryption since the value of the initialization vector is renewed frequently.

The fact of using the XOR function for the bitwise combination enhances the security of the encryption and simplifies the implementation thereof.

The use of a recall function parameterized by a value of the initialization vector and by an order number makes it possible to stream encrypt a downstream branch instruction while processing the other instructions of the instruction stream in the order that they occur in this instruction stream.

The addition and use of a downstream basic block in the instruction stream for encrypting a downstream branch instruction while retaining the possibility of encrypting the other instructions in the order that they occur, makes it possible to simplify the recall function to be used since it no longer needs to be parameterized, for example, by an initialization vector and/or an order number.

The use of the homomorphic properties of the stream encryption operation for constructing the ciphertext of a downstream branch instruction makes it possible to obtain this ciphertext without ever sending the downstream branch instruction to the encryption module.

The use of a random or pseudo-random draw of a numerical value makes it possible to randomly or pseudo-randomly vary, at each execution, the executed code for performing the predetermined function.

The use of a secret key common to the encryption and decryption modules creates a pairing between these two modules and prevents the instruction stream generated, encrypted and recorded in the main memory by the encryption module from being able to be executed by another microprocessor provided with another decryption module parameterized with a different secret key.

The fact of using encryption and decryption modules hard etched inside the microprocessor enhances the security of the execution of the polymorphic machine code.

The invention claimed is:
1. A method for executing a polymorphic machine code of a predetermined function using a microprocessor, comprising:
a) acquiring a numerical value capable of varying, from one execution to another of the same polymorphic machine code, then b) generating, according to the numerical value acquired, a first and, alternately, a second instruction stream, the first and second instruction streams each being capable of performing the predetermined function when they are executed by the microprocessor, each of the instruction streams being formed of a succession of basic blocks, each basic block starting at a branch address and ending with a branch instruction to a branch address of another basic block, and the first and second instruction streams being distinguished from each other by at least one instruction opcode or a different operand or a different literal value or a different number of instructions,
c) recording a generated instruction stream in a main memory, then
d) executing the generated instruction stream that has just been recorded,
wherein:
before step c):
for each branch address at which a basic block starts, automatically adding into the generated instruction stream a renewal instruction capable, when executed by the microprocessor, of triggering, immediately after a branching to the branch address, renewal of an initialization vector of a stream decryption module with a specific value associated with the branch address, then
a stream encryption module, parameterized by an initialization vector, encrypts the instruction stream as it is generated, in the course of the encryption each basic block is encrypted using the specific value of the initialization vector associated with the branch address at which it starts,
during step c), only the instruction stream thus encrypted is recorded in the main memory, and
during step d), each time an encrypted instruction of the instruction stream is loaded from the main memory for being executed, the encrypted instruction is first decrypted by the decryption module, then transferred, without passing through the main memory, to an arithmetic and logic unit of the microprocessor, then executed by the arithmetic and logic unit, and in the course of step d), the added renewal instructions are executed as they are encountered in the instruction stream.

2. The method as claimed in claim 1, comprising, during step b), executing a group of instructions of the polymorphic machine code, termed a generator, which generates the instruction streams, the instructions of the generator being recorded in the main memory only in encrypted form so that step b) comprises loading of an encrypted instruction of the generator from the main memory, then its decryption by the microprocessor, followed by its transfer, without passing through the main memory, to the arithmetic and logic unit of the microprocessor and execution of the decrypted instruction of the generator by the arithmetic and logic unit.

3. The method as claimed in claim 1, comprising adding the renewal instruction at the start of each basic block so that the execution of the basic block starts with the execution of the renewal instruction.

4. The method as claimed in claim 1, wherein:
the renewal instruction of the value of the initialization vector of a next basic block to be executed is added into a preceding basic block to be executed immediately before the next basic block, and
during the encryption, the renewal instruction added into the preceding basic block is encrypted by using the same value of the initialization vector as that used for encrypting all the other instructions of the preceding basic block.

5. The method as claimed in claim 1, wherein:
during the encryption, the instruction stream is only encrypted by combining it bitwise, using a predetermined function, with a pseudo-random sequence generated by a pseudo-random sequence generator initialized, at the start of each basic block, with the specific value associated with the branch address at which the basic block starts, and
during the decryption, the instruction stream is decrypted by combining it bitwise, using the inverse of said predetermined function, with a pseudo-random sequence generated by an identical pseudo-random sequence generator initialized, at the start of each basic block, with the specific value associated with the branch address at which the basic block starts.

6. The method as claimed in claim 5, wherein:
during step b), one of the basic blocks of the generated instruction stream comprises a downstream branch instruction to a downstream branch address the numerical value of which is not immediately determinable by the microprocessor since it depends on a number of instructions contained in a future part of the instruction stream that has not yet been generated at this time,
during the encryption of the instruction stream as it is generated, when the downstream branch instruction is encountered in the basic block in the course of encryption:
a space of a same size or larger than a size of the encrypted downstream branch instruction is reserved in the main memory, at a location where the encrypted downstream branch instruction has to be recorded, and
a recall function is associated with a label corresponding to the downstream branch address, the recall function being parameterized by the specific value of the initialization vector associated with the branch address at which the basic block in the course of encryption starts and an order number identifying the position of the downstream branch instruction with respect to the start of the basic block in the course of encryption, then
the encryption of the instruction stream continues without, at this stage, having encrypted the downstream branch instruction and recorded it in the main memory,
when said future part of the instruction stream has been generated, executing the recall function associated with the label corresponding to the downstream branch address, the execution of the recall function causing:
replacement of the label with the numerical value of the downstream branch address in the downstream branch instruction,
initialization of the encryption module with the value of the initialization vector which parameterizes the recall function,
generation by the encryption module thus initialized of a pseudo-random sequence until generating the succession of bits of the pseudo-random sequence corresponding to the order number which parameterizes the recall function, then
bitwise combination of the generated succession of bits with the downstream branch instruction in which the label has been replaced by the numerical value of the downstream branch address, then
recording of the downstream branch instruction thus encrypted in the space reserved for this purpose in the main memory.

7. The method as claimed in claim 1, wherein:
during step b), one of the basic blocks of the instruction stream comprises a downstream branch instruction to a downstream branch address the numerical value of which is not immediately determinable by the microprocessor since it depends on a number of instructions contained in a future part of the one instruction stream that has not yet been generated at this time,
during the encryption of the instruction stream as it is generated, when the downstream branch instruction is encountered in the basic block in the course of encryption:
inserting into the instruction stream, a downstream basic block located immediately after the basic block in the course of encryption, a size of the downstream basic block being known and the downstream basic block ending with a copy of the downstream branch instruction,
replacing the downstream branch instruction in the basic block in the course of encryption, with an unconditional branch instruction to the branch address at which the inserted downstream basic block starts,
encrypting the unconditional branch instruction then recording it in the main memory at a location where the encrypted downstream branch instruction would have had to be recorded,
reserving in the main memory, at the location where the encrypted downstream basic block has to be recorded, a space at least a same size as the downstream basic block,
associating a recall function with a label corresponding to the downstream branch address, then
continuing the encryption of the instruction stream without, at this stage, having encrypted the inserted downstream basic block and recorded it in the main memory,
when said future part of the instruction stream has been generated, executing the recall function associated with the label corresponding to the downstream branch address, the execution of the recall function causing:
the replacement of the label with the numerical value of the downstream branch address in the downstream branch instruction of the inserted downstream basic block,
the encryption by the encryption module of the inserted downstream basic block using for the specific value of the initialization vector associated with the branch address at which the inserted downstream basic block starts, then
the recording of the downstream basic block thus encrypted in the space reserved for this purpose in the main memory.

8. The method as claimed in claim 5, wherein:
an encryption operation, denoted by Encrypt(m), implemented by the encryption module is homomorphic with respect to an operation ⊙, Encrypt(m) ⊙Encrypt(r) =Encrypt(m ⊙ r),
during step b), one of the basic blocks of the generated instruction stream comprises a downstream branch instruction to a downstream branch address the numerical value of which is not immediately determinable by the microprocessor since it depends on a number of instructions contained in a future part of the instruction stream that has not yet been generated at this time, during the encryption of the instruction stream as it is generated, when the downstream branch instruction is encountered in the basic block in the course of encryption:

the downstream branch instruction is replaced with a ciphertext R such that R=Encrypt(r), where r is a known word of a same length as the downstream branch instruction, the ciphertext R is recorded in the main memory at a location where the encrypted downstream branch instruction has to be recorded, and a recall function is associated with a label corresponding to the downstream branch address, the recall function being parameterized by the specific value of the initialization vector associated with the branch address at which the basic block in the course of encryption starts, with an order number identifying the position of the downstream branch instruction with respect to the start of the basic block in the course of encryption, and with the word r, then the encryption of the instruction stream continues without, at this stage, having encrypted the downstream branch instruction and recorded it in the main memory, when said future part of the instruction stream has been generated, the recall function associated with the label corresponding to the downstream branch address is executed, the execution of this the recall function causing:

determination of a word x such that $x \odot r = i$, where i is the downstream branch instruction in which the label has been replaced by the numerical value of the downstream branch address and r is the word which parameterizes the recall function, initialization of the encryption module with the value of the initialization vector which parameterizes the recall function, generation by the encryption module thus initialized of a pseudo-random sequence until generating a succession of bits of the pseudo-random sequence corresponding to the order number which parameterizes the recall function, then bitwise combination of the generated succession of bits with the word x determined for obtaining a ciphertext X, then calculation of $R \odot X$ to obtain a ciphertext of the downstream branch instruction, then recording of the ciphertext of the downstream branch instruction thus obtained in the main memory in place of the word R.

9. The method as claimed in claim 1, wherein step a) comprises, at each execution of the polymorphic machine code, a random or pseudo-random drawing of said numerical value.

10. The method as claimed in claim 1, wherein during steps b) and d), the encryption module and the decryption module are each parameterized by a secret key so that the encrypted instruction stream also varies according to the value of the secret key, a value of the secret key remaining unchanged throughout the execution of the polymorphic machine code.

11. The method as claimed in claim 1, wherein the predetermined function is a primitive ciphertext capable of encrypting or decrypting data.

12. A non-transitory computer readable recording medium storing a polymorphic machine code of a predetermined function, the polymorphic machine code comprising instructions executable by a microprocessor which, when executed by the microprocessor, causes:

a) acquisition of a numerical value capable of varying, from one execution to another of the same polymorphic machine code, then b) generation, according to the numerical value acquired, of a first and, alternately, a second instruction stream, the first and second instruction streams each being capable of performing the predetermined function when they are executed by the microprocessor, each of the instruction streams being formed of a succession of basic blocks, each basic block starting at a branch address and ending with a branch instruction to a branch address of another basic block, the first and second instruction streams being distinguished from each other by at least one instruction opcode or a different operand or a different literal value or a different number of instructions, c) recording of a generated instruction stream in a main memory, then d) execution of the generated instruction stream that has just been recorded, wherein:

before step c):

for each branch address at which a basic block starts, the microprocessor automatically adds into the generated instruction stream a renewal instruction capable, when executed by the microprocessor, of triggering, immediately after the branching to the branch address, renewal of an initialization vector of a stream decryption module with a specific value associated with the branch address, then a stream encryption module, parameterized by an initialization vector, encrypts the instruction stream as it is generated in the course of the encryption each basic block is encrypted using the specific value of the initialization vector associated with the branch address at which it starts, during step c), only the instruction stream thus encrypted is recorded in the main memory, and during step d), each time an encrypted instruction of the instruction stream is loaded from the main memory for being executed, the instruction is first decrypted by the decryption module, then transferred, without passing through the main memory, to an arithmetic and logic unit of the microprocessor, then executed by the arithmetic and logic unit, in the course of step d), the added renewal instructions are executed as they are encountered in the instruction stream.

13. An electronic apparatus configured to execute a polymorphic machine code of a predetermined function, the apparatus comprising a microprocessor programmed for performing the following steps:

a) acquisition of a numerical value capable of varying, from one execution to another of the same polymorphic machine code, then b) generation, according to the numerical value acquired, of a first and, alternately, a second instruction stream, the first and second instruction streams each being capable of performing the predetermined function when they are executed by the microprocessor, each of the instruction streams being formed of a succession of basic blocks, each basic block starting at a branch address and ending with a branch instruction to a branch address of another basic block, the first and second instruction streams being distinguished from each other by at least one instruction opcode or a different operand or a different literal value or a different number of instructions, c) recording of a generated instruction stream in a main memory, then d) execution of the generated instruction stream that has just been recorded, wherein the microprocessor is also programmed for performing the following steps:

before step c):

for each branch address at which a basic block starts, the microprocessor automatically adds into the generated instruction stream a renewal instruction capable, when executed by the microprocessor, of triggering, immediately after the branching to the branch address, renewal of an initialization vector of a stream decryption module with a specific value associated with the branch address, then a stream encryption module, parameterized by an initialization vector, encrypts the instruction stream as it is generated, in the course of the encryption each basic block is encrypted using the specific value of the initialization vector associated with the branch address at which it starts, during step c), only the instruction stream thus encrypted is recorded in the main memory, and during step d), each time an encrypted instruction of the instruction stream is loaded from the main memory for being executed, the instruction is first decrypted by the decryption module, then transferred, without passing through the main memory, to an arithmetic and logic unit of the microprocessor, then executed by the arithmetic and logic unit, in the course of step d), the added renewal instructions are executed as they are encountered in the instruction stream.

14. The apparatus as claimed in claim 13, wherein the encryption and decryption modules are only implemented in physical circuits formed on the same substrate as that on which the physical circuits of the arithmetic and logic unit of the microprocessor are formed.

* * * * *